Patented May 7, 1929.

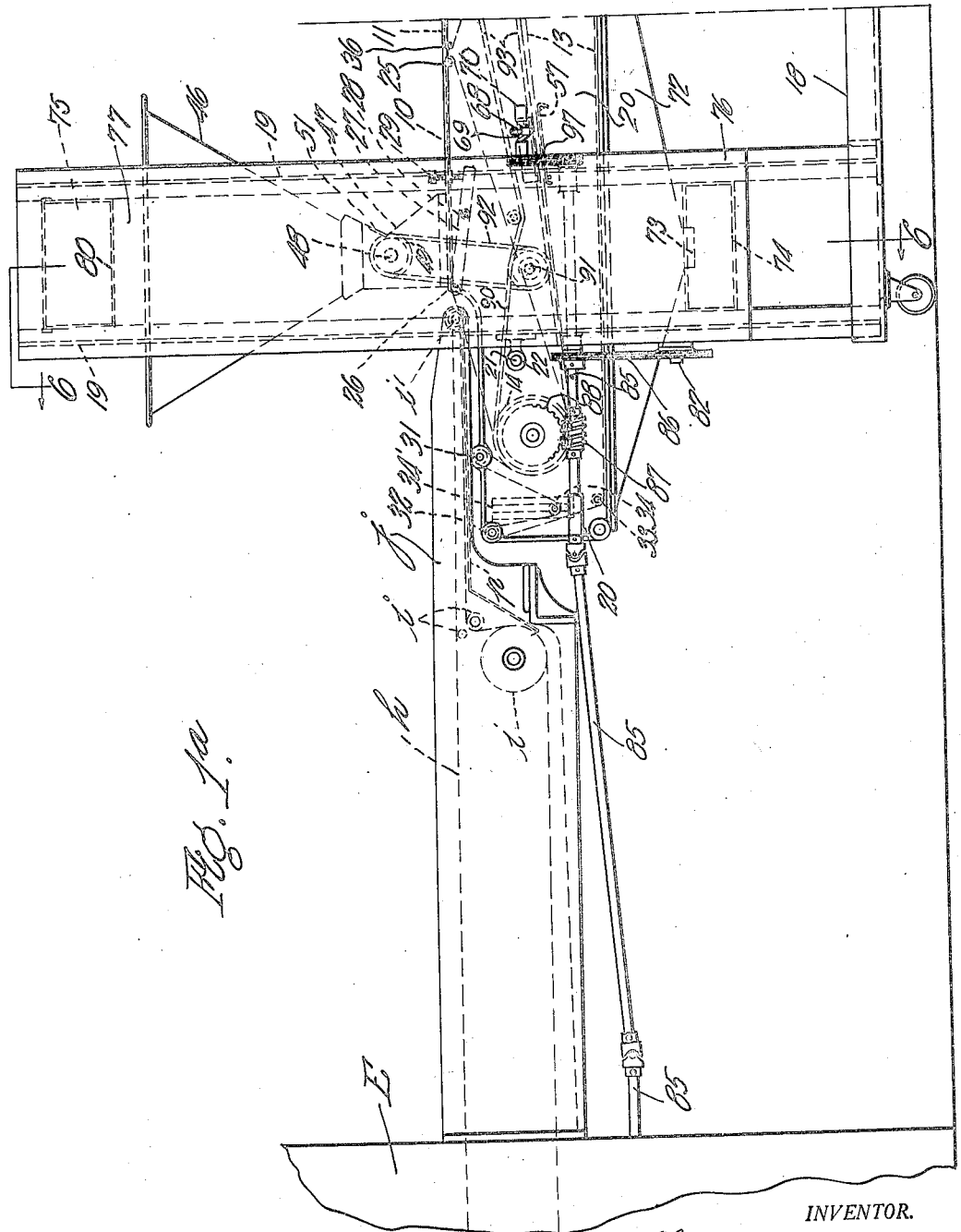

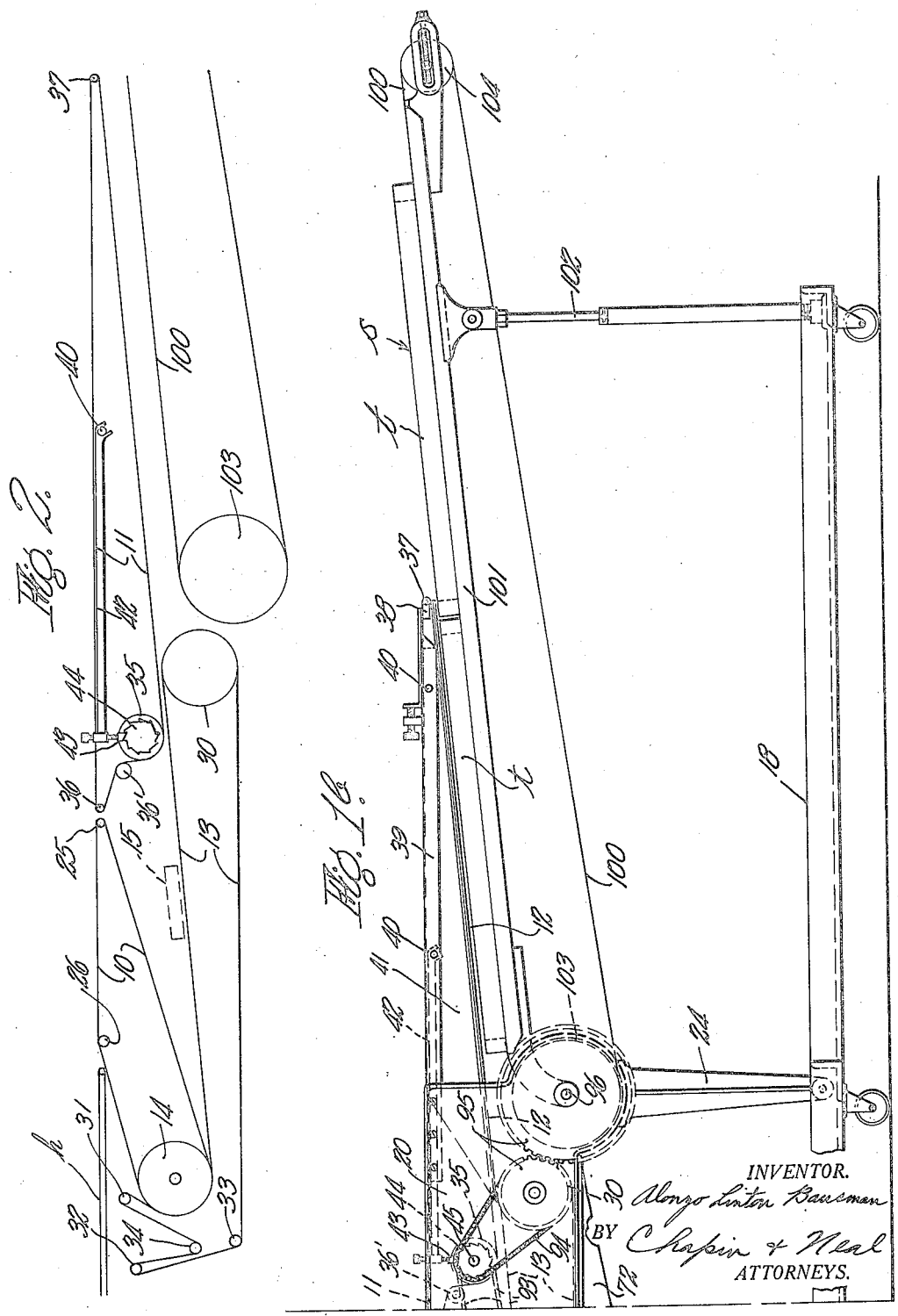

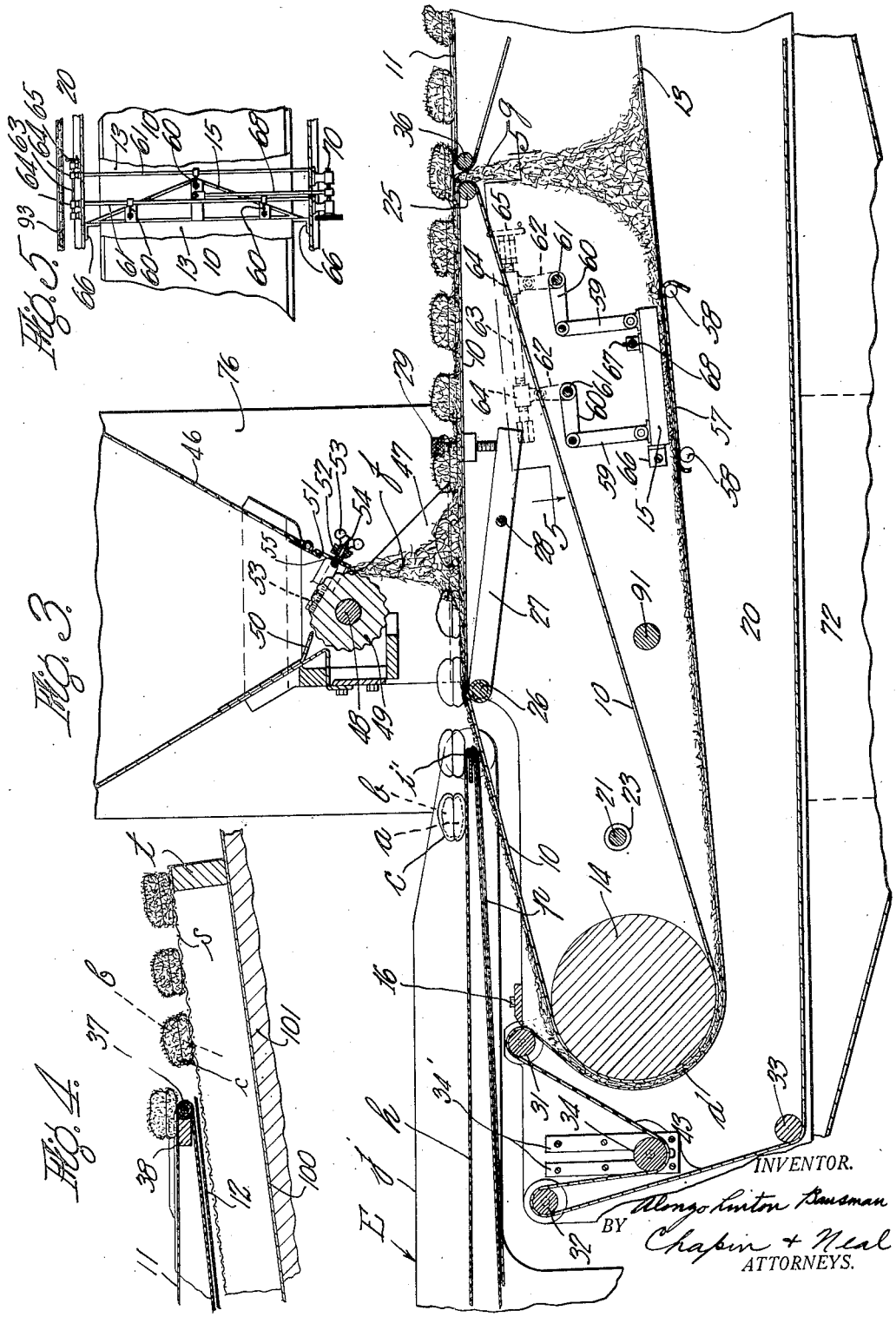

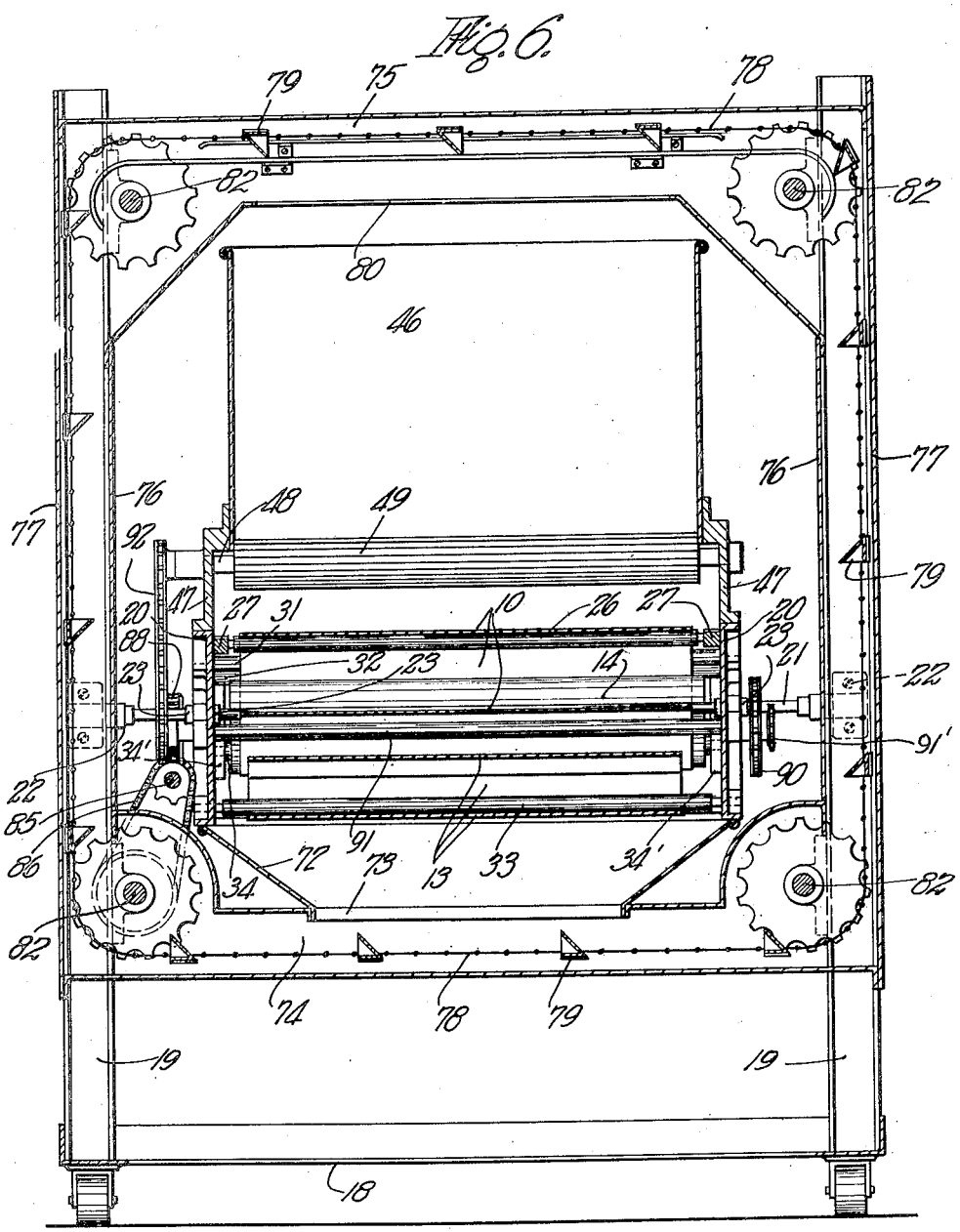

1,711,716

UNITED STATES PATENT OFFICE.

ALONZO LINTON BAUSMAN, OF SPRINGFIELD, MASSACHUSETTS, ASSIGNOR TO NATIONAL EQUIPMENT COMPANY, OF SPRINGFIELD, MASSACHUSETTS, A CORPORATION OF MASSACHUSETTS.

CONFECTION-COATING MACHINE.

Application filed May 25, 1926. Serial No. 111,665.

This invention relates to confection coating machines and has for its object the provision of a machine for applying a non-fluid coating of more or less finely divided solids to confections which have a viscous, sticky coating to which the applied solids will adhere.

The invention will be disclosed herein with reference to one of its specific uses, wherein a coating of shredded cocoanut is applied to confections freshly coated with chocolate. The cocoanut shreds stick to the soft viscous coating and are thus held to the confection when the coating hardens. Other solids may be applied instead of cocoanut and the finely divided solids may be applied to any confections which have sticky surfaces or coatings of a viscous nature applied thereto. Also, the confections may be completely coated or merely on one side only. The novelty of this invention relates primarily to a means for applying the bottom coating. By confections is meant any edible article which one may desire to coat in the manner hereinafter disclosed. In the particular example given herein for illustrative purposes, the confections are biscuits having a deposit of marshmallow thereon—the biscuit and marshmallow deposit being completely enveloped by a chocolate coating.

According to this invention, the cocoanut, or other material, is first formed in a layer or blanket of substantially uniform depth on an impervious belt and this blanket is carried into such a position that the confections, freshly coated with chocolate, may be deposited thereon. In this way, cocoanut adheres to the bottoms and to parts of the sides of the confections and, if it is desired to coat the remaining portions of the confections, they may be made to pass through a descending transverse stream of cocoanut and thereby coated in much the same manner in which confections are coated in a well known type of chocolate coating machine. The coating, or coatings, having been thus applied, the confections are transferred to a pervious conveyer which is agitated in order to shake the confections and free the same of any particles of cocoanut which do not firmly adhere to the chocolate coatings. As the confections pass from one conveyer to the other, the unused portions of the cocoanut blanket fall through the gap between the conveyers.

Another feature of the invention consists in collecting all portions of cocoanut, not used in a previous coating operation, and distributing such portions into a blanket of even thickness on a conveyer by suitable means, such as a plow for example, which means functions to make the distribution of the cocoanut, gauge the thickness of the blanket formed therefrom and throw any excess cocoanut not needed for the formation of the blanket off the sides of the conveyer.

Another feature of the invention relates to the formation of a cocoanut blanket on one conveyer and subsequently transferring it to another conveyer while maintaining all the loose material in blanket form during the transfer.

Other objects and advantages will appear in the following description and will be pointed out in the appended claims.

The invention will be disclosed with reference to the accompanying drawings, in which:—

Figs. 1ª and 1ᵇ, when joined together end to end, present a side elevational view of an apparatus embodying the invention;

Fig. 2 is a small scale view showing, in conventional form, the arrangement of the various conveyers of the apparatus;

Fig. 3 is an enlarged fragmentary sectional elevational view of the central part of the apparatus;

Fig. 4 is a similar view of the delivery end of the same;

Fig. 5 is a fragmentary sectional plan view taken on the line 5—5 of Fig. 3; and Fig. 6 is a cross sectional view taken on the line 5—5 of Fig. 1ª.

The coating apparatus of this invention is particularly concerned with the application of a coating of more or less finely divided solids, such as shredded cocoanut or other material of a generally analogous nature, to confections which have been freshly covered with a viscous coating, such as chocolate or the like. In the particular illustrative example shown, biscuits a (Fig. 3), on which a deposit b of marshmallow or other desired substance has previously been made, are completely enveloped with a chocolate coating c. The chocolate coating can be applied in any suitable way but usually the confections are coated automatically in a chocolate coating machine, which is conventionally represented at E. In any case, the confections, while the coatings are still soft and viscous, are fed upon a moving blanket $d$ of shredded cocoanut, or such other finely divided material as one desires to apply. This blanket is carried by an impervious conveyer belt 10, such as canvas or the like, and the confections deposited on the blanket with the soft side up are carried thereby in under a regulated transverse stream $f$ of cocoanut, by means of which the tops and sides of the confections are coated. After the articles have been carried through the shower stream $f$, they are automatically transferred to a conveyer 11, which is of a pervious nature and preferably a so-called wire belt. As the confections pass from belt 10 to belt 11, those portions of the cocoanut blanket $d$ between the confections fall freely through the space $g$, while the remainder of the blanket, or a large part of it, adheres to the confections previously deposited thereon. The belt 11 is agitated to shake off any loose particles of cocoanut which fail to adhere to the confections, after which the finished confections ride off belt 11 onto suitable receiving means.

According to some features of the invention the cocoanut blanket $d$ on belt 10 may be formed in any suitable manner. However, according to one special feature of the invention, the blanket is formed from the excess and unused cocoanut, which falls through the space $g$ between the belts 10 and 11. The excess cocoanut, removed from the confections while on the vibrating, wire-mesh belt 11, is, or may be, also used for this purpose. The belt 11, in its lower course of travel, runs over a chute 12, (Fig. 1$^b$), which is downwardly inclined in the direction of the return travel of belt 11, and the cocoanut falling through the meshes of belt 11 in its upper course of travel drops upon chute 12 and is scraped along the latter by belt 11 in its return or lower course of travel. The chute 12 delivers its cocoanut upon the upper course of travel of an impervious belt 13, which may be of canvas. The upper course of this belt underlies the lower course of belt 10 (Fig. 3) and slopes downwardly toward, and travels toward, the drive roll 14 for belt 10. Consequently, the cocoanut falling in a stream at $g$ falls upon the belt 13. However, such cocoanut is not evenly distributed on belt 13 and a vibrating plow 15, which overlies the upper course of belt 14 and can be adjusted toward and away from the same, is used to spread the cocoanut into a blanket of uniform and regulated thickness,—any excess falling from the sides of the belt to to be subsequently elevated and again used for coating purposes in a manner later to be described.

The blanket, having been thus formed on belt 13, is then applied to belt 10 and this is effected by making the belt 13 pass around a substantial portion of the periphery of the end roll 14, whereby the loose cocoanut is retained between the two belts 10 and 13 in blanket form, while travelling upwardly. After the cocoanut has been thus elevated, belt 13 is caused to leave belt 10 and the blanket then rests on the upper stretch of belt 10 and is carried upwardly thereby in a gently sloping path to the level at which the confections are fed to it. To insure that all the cocoanut leaves belt 13 a scraper 16 is arranged to bear upon the belt at a location slightly above the drive roll 14.

The apparatus is usually used in conjunction with a chocolate coating machine, a small fragment of the delivery end of which has been indicated at E (Fig. 1$^a$). Such machine may be of any suitable type, and many examples of various suitable types will be found in the prior art. Usually such machines include a wire mesh conveyer on the upper course of which the candies are carried through the machine. A small portion of such a conveyer is shown at $h$, suitably mounted on rolls $i$, which in turn are mounted in and extend between a pair of spaced side frames $j$. The only unusual feature here is that the belt $h$, which at the delivery end of its upper course of travel passes around the very small roll $i'$, moves in the initial stage of its return travel in a path closely adjacent and substantially parallel to the upper course (Fig. 3). This enables the belt 10, which carries the cocoanut blanket, to underlie belt $h$ and move upwardly with a gradual slope to bring the blanket of cocoanut closely adjacent the roll $i'$ and into substantially the plane of the upper course of belt $h$. A drip pan $p$ underlies the lower course of belt $h$ and prevents the chocolate dripping therefrom from falling on the cocoanut blanket or on belt 13 or any other underlying parts.

The apparatus of this invention is desirably, although not necessarily, portable and to this end is entirely supported from a wheeled angle-iron frame 18 (Figs. 1$^a$, 1$^b$ and 6). Secured to this frame near one end are two laterally spaced pairs of vertically upstanding I-beams 19 (Figs. 1$^a$ and 6) which form part of the framework of a cocoanut elevator. The latter is a desirable adjunct to the apparatus although it is not necessarily essential for all purposes. Between the two pairs of I-beams 19 are two laterally spaced side frames 20 which are disposed at right angles to said pairs of beams and project to the right and left beyond the same. These frames 20, which are suitably tied together transversely, are supported by a shaft 21, which is fixed at its ends in two brackets 22 secured to two of the I-beams 19. Collars 23 (Fig. 6) fixed to shaft 21 hold the frames in proper laterally spaced relation. The portions of the side frames projecting to the left of the I-beams, underlie the narrow end portions of the coating machine frames *j*. The other ends of side frames 20 are supported by pedestals 24 (Fig. 1$^b$) from the angle iron frame 18.

The side frames 20 serve to support the rolls for the belts 10, 11 and 13 and the various belts and rolls are shown in conventional form in Fig. 2 for convenience. The belt 10 is supported by the described roll 14, which is its driving roll, and a small roll 25. The latter is so located that the delivery end of the upper course of belt 10 lies in the plane of the upper course of belt *h*. A roll 26 is mounted in a frame 27 (Fig. 3) pivoted to a shaft 28 mounted at its ends in the side frames 20, which is adjustable by screws 29 mounted in said frames. This roll 26 bears on the belt 10 from below during its upper course of travel and, being adjustable, serves to raise or lower belt 10 to vary the clearance between the wire belt *h* and the blanket-carrying belt 10, whereby the cocoanut blanket may be brought closer to and more nearly into the plane of the upper course of belt *h* or farther away and less nearly in said plane. The belt 13 is driven from a roll 30 and is supported by the latter in conjunction with guide rolls 31, 32 and 33. A roll 34, the ends of which are vertically slidable in guides 34′ (Figs. 3 and 6) fixed to side frames 20, acts on belt 13 as it passes from roll 31 to roll 32 and by its weight serves to tension the belt. The roll 14, as described, also serves to guide belt 13 and roll 31 serves to lead the belt away from the blanket-carrying belt 10. The scraper 16 (Fig. 3), which acts on belt 13 as it passes around roll 31, is suitably secured at its ends to the upper edges of side frames 20. The rolls 32 and 33 serve to direct the return course of travel of belt 13. The wire belt 11 is driven from a roll 35 and guided by idler rolls 36, 36′ and 37. Each of the rolls 14, 25, 30, 31, 32, 33, 35 and 36 are mounted at their ends in and extend between the side frames 20. The roll 36 in conjunction with roll 37 defines the upper course of travel of belt 11 and guide it in a horizontal path and substantially in the plane of the wire belt *h*. The roll 37 (Fig. 1$^b$) is mounted at its ends in bearings 38 which are slidably mounted for adjustment purposes on angle irons 39 secured one to each side frame 20 and projecting longitudinally beyond the same. The angle irons 39 are suitably tied together transversely, as by a pair of tie rods 40. The chute 12, above described, is supported from the angle irons 39 by integral upturned side extensions 41 which are fastened to the depending legs of the angle irons.

The belt 11 may be agitated in any suitable manner. As shown, the arrangement is substantially like that disclosed in U. S. Letters Patent No. 1,445,550, granted February 13, 1923, on an invention of George S. Perkins. A rapper frame 42 (Figs. 1$^b$ and 2) pivotally supported near one end on one of the tie rods 40, is supported near the other end by adjustable pawls 43 from ratchet wheels 44. The latter are fixed to the shaft 45, which carries the described roll 35, and are arranged one adjacent each side frame 20. The frame 42 underlies belt 11 in closely adjacent relation and, as the ratchets 44 turn continuously, the frame is raised and lowered to vibrate belt 11 in an obvious manner. For a more complete disclosure of a vibrating wire belt, which can, with slight modifications in detail, be used for the purpose, reference is made to the patent above identified.

Referring now to the means for supplying cocoanut in a transverse evenly distributed stream upon the belt 10 and the confections carried thereby. While any suitable means may be employed for the purpose, that shown herein by way of illustrative example has proved, as a practical matter to be satisfactory and desirable. The means, shown herein, includes a hopper 46 (Figs. 3 and 6) to contain a supply of the cocoanut, or other material. This hopper is supported by brackets 47 from the upper edges of side frames 20 so that the hopper extends transversely across and spans said frames in overlying relation with belt 10. The front and rear walls of hopper 46 (Fig. 3) converge in a downwardly direction but do not meet. Rotatably mounted at its ends in brackets 47 (Fig. 6) is a shaft 48 which carries a corrugated roll 49. The latter is so located as to underlie the lower and discharge end of hopper 46 (Fig. 3) and its ends lie closely adjacent the sides of the hopper. The opening between the sloping rear wall of the hopper and the periphery of roll 49 is closed by a wiper 50 which is mounted on said rear wall for adjustment toward or away from the roll and the free end of which bears on the periphery of the same. Pivotally mounted on the front sloping wall of hopper 46 is a gate 51 which may be swung in or out with respect to roll 49 to vary the width of the outlet which is formed therebetween. As shown, the gate is movable with a cross bar 52 which at its ends is adjustably secured by screws 53 to brackets 47. The screws 53 turn in bar 52 but are held from moving axially relatively thereto, whereby by turning the screws, bar 52 can be adjusted toward or away from the roll 49. Two or more screws 54 passing loosely through gate 51 are fastened to cross bar 52 and the gate 51 is loosely received between the heads of screws 54 and nuts 55 on the latter. Thus, the end of gate 51 may be adjusted relatively to roll 49 to gauge the outlet opening formed therebetween. The corrugations in roll 49 serve to feed the cocoanut particles toward said outlet. The arrangement described is given as one example of various means which may be used to produce a transverse stream $f$ of cocoanut of regulable and controlled thickness.

The stream $f$ in addition to its function of coating the tops of the confections, also serves to deposit cocoanut on belt 10 in the spaces between the confections which cocoanut, together with excess coating removed from the confections, is eventually carried as above described, to the belt 13 for the purpose of forming a blanket of coating for use in coating the bottoms of the confections. To regulate the thickness of this blanket, as well as to insure an equal distribution of cocoanut on belt 13, the plow 15 is used. Underlying the belt 13 below the plow is a metal plate 57 which is supported on studs 58 screwed into the adjacent side frames 20. This plate 57 serves to fix the relation of belt 13 to the plow by preventing the belt from sagging. The distance between the belt and plow is variable by any suitable adjustment. As shown, the necessary relative movement is effected by raising or lowering the plow but it may obviously be otherwise effected. The plow, which is V-shaped (Fig. 5), is suspended by links 59 from the outer ends of arms 60. The latter are fixed to shafts 61, mounted at their ends in the side frames 20 (Fig. 5). The two arms 60 near the back of the plow are connected to one shaft 61 while the other shaft supports a single arm 60 near the point of the plow. These shafts 61, at one end, pass outside one of the frames 20 and carry arms 62 fixed thereon. Above these arms 62 is a screw threaded shaft 63, (Figs. 3 and 5) which is rotatably mounted in suitable bearings fixed to said frame 20 and held, as indicated, against endwise movement therein. Shaft 63 carries two nuts 64, one for each arm 62, and each nut is connected by a pin and slot connection to its arm 62. On turning shaft 63, by the handwheel 65 provided for that purpose, the nuts 64 are moved longitudinally thereon and cause the arms 62 to swing, whereby arms 60 are raised and lowered to vary the distance between the base of the plow and belt 13. The rear end of plow 15 is prevented from displacement longitudinally with respect to belt 13 by abutments 66 secured to the adjacent side frames 20. In order to vibrate the plow, an upstanding pin 67, mounted on the plow frame, is connected by a connecting rod 68 to a crank 69 on a shaft 70 mounted in suitable bearings on one of the side frames 20.

The cocoanut which falls on belt 13 is in excess of that required for forming the cocoanut blanket and the excess is forced off the sides of belt 13 by plow 15 and falls into a hopper 72 (Figs. 1$^a$ and 3). The latter is suitably suspended from the side frames 20 and extends entirely across and substantially entirely along these frames. All four sides of this hopper slope downwardly (Figs. 1$^b$ and 6) and lead to a discharge opening 73 (Fig. 6) through which the cocoanut is delivered into a sheet metal box 74. The latter is fastened at its ends to the I-beams and extends horizontally across from one pair of I-beams to the other. A similar box 75, is similarly mounted near the upper ends of the I-beams. Plates 76 and 77 connect the inner and outer faces of each pair of I-beams and afford between them vertical channels extending between and communicating with the ends of the upper and lower horizontal boxes 74 and 75. In this way, a channel is formed which extends beneath the hopper to receive cocoanut therefrom, thence upwardly to a level above the hopper, thence across the open top of the same and thence downwardly. A pair of sprocket chains 78, connected at longitudinally spaced intervals by buckets 79, are arranged to travel in the channel described and to pick up cocoanut in the box 74 and carry it up to and across into box 75, from which it falls through an opening 80 in the latter into the hopper. The chains are mounted on suitable sprockets fixed in pairs to four shafts 82. The latter are rotatably mounted in suitable bearings fixed to the I-beams.

Referring now to the driving mechanism, all parts as shown, are driven from the coating machine E in proper timed relation with belt $h$. For example, the machine E has a shaft 85 (Fig. 1$^a$) connected with the driving means for belt $h$ and this shaft is extended to one of the side frames 20, as shown. Shaft 85 is connected by a chain 86 (Figs. 1$^a$ and 6) and suitable sprockets to one of the shafts 82 of the cocoanut elevator, whereby the latter is driven. Shaft 85 also carries a worm 87 (Fig. 1$^a$) which drives a worm gear 88, fixed to the shaft of roll 14, whereby the blanket-carrying belt 10 is driven. The opposite end of the shaft of roll 14, from that on which worm gear 88 is fixed, is connected by a chain 90 (Figs. 1$^a$ and 6) and suitable sprockets to one end of a shaft 91 which is rotatably mounted near its ends in and extends transversely across between side frames 20. Shaft 91, at its other end, is connected by a chain 92 and suitable sprockets to the shaft 48, whereby the cocoanut feeding roll 49 is driven. The first named end of shaft 91 carries a sprocket 91' (Fig. 6) which is connected by a chain 93 (Figs. 1ª and 1ᵇ) to a sprocket on the described shaft 45, which carries the drive roll for the wire belt 11 and the ratchets 44 for vibrating the same. The opposite end of shaft 45 is connected by a chain 94 (Fig. 1ᵇ) and suitable sprockets to the shaft of roll 30, whereby the belt 13, on which the cocoanut blanket is formed, is driven. The shaft of roll 30 is likewise connected by spur gears 95 to a shaft 96 which is, or may be, used to drive a delivery belt to be described. The shaft 85 is also connected by a chain 97 (Fig. 1ª) and suitable sprockets to the crankshaft 71, whereby the plow is vibrated.

The coated articles leaving the vibrating belt 11 may pass onto any suitable receiving means. As best shown in Fig. 4, they pass onto a screen s covering the top of a rectangular frame t. These frames are carried by a belt 100 the upper course of which is supported by a table 101 (Fig. 1ᵇ). The latter is pivotally supported at one end from the shaft 96, above described, and at the other end by a vertically adjustable strut 102 from the wheel-supported angle-iron frame 18, heretofore described. The belt 100 is trained over two rolls 103 and 104, the former being a drive roll and being fixed to shaft 96 while the latter is supported in bearings, preferably adjustably as indicated, from the forward end of table 101. The frames t are placed one at a time by hand upon belt 100 at a location underlying the chute 12 and are moved slowly in a slightly upwardly inclined path past the delivery end of belt 11. The coated articles drop from the latter in successive rows and fall upon the screen s and since the screen is moved at a speed less than that of belt 11 the articles are more closely spaced thereon than on belt 11. As soon as one screen s is filled it is removed by hand.

In operation, the biscuits a, having the deposit b of marshmallow, are fed through the coating machine E and completely covered with chocolate. These chocolate coated articles are delivered by belt h and fall upon a blanket of cocoanut carried by belt 10 and some of the cocoanut adheres to the bottoms and sides of the freshly coated confections. As the latter move forwardly, they are carried through a transverse stream f of cocoanut, whereby the tops of the confections are coated. As the confections progress still farther, they pass onto the vibrating wire belt 11 and, as they are transferred, most of the unused portions of cocoanut fall at g onto the underlying belt 13. As the articles travel along with the vibrating belt 11, any loose particles of cocoanut are shaken therefrom and these particles fall through the meshes of belt 11 upon chute 12, from which they are scraped back by the belt 11 in its return course of travel onto the belt 13. The cocoanut deposited on the latter from both of the sources described is more or less unevenly distributed and the function of plow 15 is to distribute the cocoanut evenly and to gauge the depth of the layer or blanket of cocoanut. All excess cocoanut over and above that necessary for the formation of the blanket is plowed off the sides of belt 13 and falls into hopper 72 to be carried by the cocoanut elevator to the hopper of the cocoanut shower forming means. The blanket formed on belt 13 is transferred to belt 10 and moved up into a position to receive confections delivered from belt h.

The invention has been disclosed, in an embodiment at present preferred, for illustrative purposes, but the scope of the invention is defined by the appended claims rather than by the foregoing description.

What I claim is:

1. The combination with a conveyer for carrying freshly coated confections, of a conveyer for carrying a layer of finely divided solids past the delivery end of the first named conveyer whereby said confections are successively deposited on said layer and become partially coated with said solids, a third conveyer having its receiving end separated by a small gap from the delivery end of the second conveyer, whereby the portions of said layer in the spaces between the confections fall through said gap, a conveyer underlying said gap and receiving the solids falling therethrough, and a plow for spreading such solids over the last named conveyer in a layer of substantially uniform depth, said last named conveyer being arranged to transfer said layer to the second named conveyer.

2. The combination with a conveyer for carrying freshly coated confections, of a conveyer for carrying a layer of finely divided solids past the delivery end of the first named conveyer whereby said confections are successively deposited on said layer and become partially coated with said solids, means for delivering a downwardly directed stream of such solids across the conveyer, a third conveyer having its receiving end separated by a small gap from the delivery end of the second conveyer, whereby such portions of said solids carried by the second conveyer and disposed between the confections fall through said gap, a conveyer underlying said gap and receiving the solids falling therethrough, a plow for spreading such solids over the last named conveyer in a layer of substantially uniform depth, and guiding means for said last named conveyer to so direct its travel that said layer is transferred to the second named conveyer.

3. The combination with a conveyer for carrying freshly coated confections, of a conveyer for carrying a layer of finely divided solids past the delivery end of the first named conveyer, whereby said confections are successively deposited on said layer and become partially coated with said solids, a third conveyer having its receiving end separated by a small gap from the delivery end of the second conveyer, whereby the portions of said layer in the spaces between the confections fall through said gap, a conveyer underlying said gap and receiving the solids falling therethrough, a vibrating plow for spreading such solids over the last named conveyer in a layer of substantially uniform depth, and guiding means for said last named conveyer to so direct its travel that said layer is transferred to to the second named conveyer.

4. In combination, a conveyer adapted in its upper stretch of travel to carry a layer of finely divided solids, end supporting rolls for said conveyer, means for depositing confections on said layer, a second conveyer having its upper stretch in part underlying the first named conveyer, means for depositing finely divided solids on said upper stretch of the second conveyer, means for distributing the deposited solids over the second conveyer into a layer of substantially uniform thickness, and means for guiding the second conveyer partially around one of the end rolls for the first conveyer to a level above the upper stretch of the latter, whereby the layer formed on the second conveyer is carried between the two conveyers upwardly to the upper stretch of the first conveyer and transferred thereto.

5. In combination, a conveyer adapted in its upper stretch of travel to carry a layer of finely divided solids, end supporting rolls for said conveyer, means for depositing confections on said layer, a second conveyer having its upper stretch in part underlying the first named conveyer, means for depositing finely divided solids on said upper stretch of the second conveyer, means for distributing the deposited solids over the second conveyer into a layer of substantially uniform thickness, means for guiding the second conveyer partially around one of the end rolls for the first conveyer to a level above the upper stretch of the latter, whereby the layer formed on the second conveyer is carried between the two conveyers upwardly to the upper stretch of the first conveyer and transferred thereto, and means for scraping the second conveyer at a point above the upper stretch of the first conveyer to insure the removal of all solids therefrom.

6. In combination, a conveyer adapted in its upper stretch of travel to carry a layer of finely divided solids, end supporting rolls therefor, means for depositing confections thereon, such confections adhering to portions of the solids underlying the same, a second conveyer the upper stretch of travel of which is substantially alined with the first conveyer but separated therefrom by a small gap through which such portions of the solids as do not adhere to the confections fall while the confections pass to the second conveyer, a third conveyer moving in its upper stretch of travel below said gap to receive the solids falling therethrough, means for spreading such solids over the third conveyer into a layer of substantially uniform depth, and guiding means to direct the third conveyer with the layer carried thereby partially around one of said end rolls and up to a level above the upper stretch of the first conveyer, whereby said layer is carried between the first and third conveyers as it passes up to said level for the purpose of maintaining the loose solids in layer form and transferring the layer to the upper stretch of the first conveyer.

7. In combination, a conveyer adapted in its upper stretch of travel to carry a layer of finely divided solids, end supporting rolls therefor, means for depositing confections thereon, such confections adhering to those portions of said solids underlying the same, a second pervious conveyer the upper stretch of travel of which is substantially alined with the first conveyer but separated therefrom by a small gap through which such portions of the solids as do not adhere to the confections fall while the confections pass to the second conveyer, a third conveyer which in its upper stretch of travel moves below said gap and receives the solids falling therethrough, means for spreading such solids over the third conveyer into a layer of substantially uniform depth, guiding means to direct the third conveyer with the layer carried thereby partially around one of said end rolls and up to a level above the upper stretch of the first conveyer, whereby said layer is carried between the first and third conveyers as it passes up to said level for the purpose of maintaining the loose solids in layer form and transferring the layer to the upper stretch of the first conveyer, means for agitating the pervious conveyor in its upper stretch of travel to free the coated confections from unattached solids, and a chute underlying the pervious conveyer to receive the solids falling therethrough and conduct them onto the upper stretch of the third conveyer.

8. In combination, a conveyer adapted in its upper stretch of travel to carry a layer of finely divided solids, end supporting rolls therefor, means for depositing confections thereon, such confections adhering to those portions of said solids underlying the same, a second pervious conveyer the upper stretch of travel of which is substantially alined with the first conveyer but separated therefrom by a small gap through which such portions of the solids as do not adhere to the confections fall while the confections pass to the second conveyer, a third conveyer which in its upper stretch of travel moves below said gap and receives the solids falling therethrough, means for spreading such solids over the third conveyer into a layer of substantially uniform depth, guiding means to direct the third conveyer with the layer carried thereby partially around one of said end rolls and up to a level above the upper stretch of the first conveyer, whereby said layer is carried between the first and third conveyers as it passes up to said level for the purpose of maintaining the loose solids in layer form and transferring the layer to the upper stretch of the first conveyer, means for agitating the pervious conveyer in its upper stretch of travel to free the coated confections from unattached solids, and a chute underlying the pervious conveyer to receive the solids falling therethrough and conduct them onto the upper stretch of the third conveyer, said pervious conveyer in its lower course of travel arranged to scrape the solids along said chute.

9. In combination, a conveyer adapted to carry a layer of finely divided solids, means to deposit confections on said layer, such confections adhering to some of the solids underlying the same, means for delivering a downward stream of such solids through which stream the confections are carried by said conveyer, a second conveyer the receiving end of which is separated from the delivery end of the first conveyer by a gap over which the confections freely pass from the first to the second conveyer but through which for the most part the solids remaining unattached to the confections pass, a third conveyer on which such solids are collected and formed into a layer, means for guiding the third conveyer with relation to the first conveyer to transfer the formed layer thereto, and means for conducting excess solids not needed for the formation of said layer to said stream delivering means.

In testimony whereof I have affixed my signature.

ALONZO LINTON BAUSMAN.